2,874,049
PROCESS FOR PREPARING A PROTEIN FOOD PRODUCT

Morton Pader, West Englewood, Harry D. Hamilton, Montvale, John J. Miles, Jr., Westwood, and Gerard J. McCrimlisk, Saddle Brook, N. J., assignors to Lever Brothers Company, New York, N. Y., a corporation of Maine No Drawing. Application August 23, 1956
Serial No. 605,719
9 Claims. (Cl. 99—14)

The present invention relates to a process for preparing a food product, and more particularly to a process for preparing a food product resembling a meat spread.

The present commercial meat spreads are prepared from meat and meat by-products. The meat and by-products are usually precooked and then chopped to the desired consistency in a food cutter, seasoning ingredients being added in the course of the cutting operation. Broth or water is also added to adjust the consistency of the product to that desired. Sometimes cereal binders are also incorporated. The chopped mixture is then heated in a steam jacketed kettle and filled into cans in conventional manner. Although the product may contain an appreciable percentage of meat particles which are individually chewy, the particles are so small that the product itself is not chewy in the human mouth.

It is the object of the present invention to provide a process of preparing a protein food product resembling a meat spread for use on sandwiches or crackers or the like which is very similar in appearance, taste and texture to the ordinary meat spread, has good nutritive value, and which can be made from relatively inexpensive oilseed proteins isolated from such plentiful sources as the soybean and the peanut.

The process of the present invention comprises in general film-drying an aqueous slurry containing oilseed protein, cutting the sheets so formed into small discrete flakes, mixing the protein flakes with an aqueous emulsion of fat, and hydrating the protein flakes.

By film drying we mean rapidly drying an aqueous film of the material to at least an 80% solids content.

The oilseed protein, such as soybean protein or peanut protein, may be prepared by various methods, the following methods of preparation being the preferred ones and forming no part of the present invention.

In the case of soybean protein, one preferred extraction procedure comprises suspending flakes of soybean meal in an aqueous solution of calcium hydroxide 0.003 molar with respect to calcium hydroxide. Steam is then sparged into the suspension of flakes, with agitation, until a temperature of about 60° C. is reached. The suspension is then pumped through a centrifuge to obtain a clarified extract, which, in the usual instance, has a pH of about 6.8 to 6.9.

The protein in the extract is then precipitated by the addition of acid, such as hydrochloric acid, to bring the pH to about 5, and subsequent centrifugation then yields a solid aqueous suspension of precipitated protein. Preferably, the precipitated protein is then resuspended in water for purposes of washing, and centrifuged again. The washed, precipitated protein can then be spray or tray dried for purposes of storage.

Another preferred extraction procedure comprises washing flakes of soybean meal with water at a pH of about 4.5, separating the washed residue, e. g., by pumping the suspension through a centrifuge, extracting the protein from the residue with dilute alkali, precipitating the protein and spray or tray drying it. Alternatively, the protein extract can be spray or tray dried directly.

In the case of peanut protein, peanut meal which is substantially free of peanut skins can be extracted with a dilute solution of alkali, the protein precipitated, washed, and then spray or tray dried.

The conditions of precipitating the protein can influence the textural characteristics of the protein in the final spread product. For example, protein precipitated by the addition of acid to an extract heated to about 100° C. yields a protein flake which on rehydration is, in most instances, chewier than a flake made under comparable conditions from protein precipitated at room temperature.

The pH of the oilseed protein flakes in the final spread product is quite critical. The protein flakes should have a pH within the range from about 4.5 to about 7.0, and preferably about 6. Accordingly, the aqueous slurry prior to film-drying is adjusted to a pH within this range by the addition of a suitable acid or alkali, for example, hydrochloric acid or sodium hydroxide, respectively. Alternatively, the protein flakes are prepared by film-drying a protein slurry at a convenient pH, usually in the range of about 6 to about 7, and then their pH in the spread is adjusted to that desired by adding the requisite amount of reagent, acid or alkali, incorporated in the aqueous emulsion of fat. Protein flakes when hydrated in the final product in the pH range from about 4.5 to about 7.0 yield soft, chewy masses which have some fibrous character. At higher pH values, for example substantially over pH 7, the protein flakes are too soft, while at lower pH values, for example substantially under pH 4.5, the protein flakes make the food product too sour and consequently not like meat spread.

The aqueous slurry for film-drying may also contain, in addition to oilseed protein and water, substantial amounts, for example 6% or 12%, of edible inner additives. The edible inner additives are present in the protein flakes themselves. The addition of edible inner additives to the aqueous slurry affects the nature of the hydrated protein flakes in the food product, and consequently the texture of the food product itself. Edible inner additives include starches; gums; fats; flavoring materials, such as smoked yeast and protein hydrolyzate; salts, such as sodium chloride and phosphates; and coloring materials, such as any of the dyes approved for use in food products.

The aqueous slurry containing oilseed protein is blended to a uniform mass in a convenient mixer and then film-dried.

Film drying may be accomplished by means of any suitable device. One commercially available device particularly suited for preparing a film with the desired characteristics is a conventional drum dryer, but other devices, such as a tray dryer, may be used under equivalent conditions.

In some instances it is preferred to prepare protein flakes directly from a protein precipitate. Thus, the protein precipitate, which is generally at about pH 5, is adjusted to the desired protein content and pH by the addition of the requisite amount of water and dilute alkali, respectively. It is then blended to a uniform paste or slurry. Inner additives may be added, if desired. The resultant paste is then converted into flakes by film-drying.

The concentration of oilseed protein in the aqueous slurry prior to film-drying may vary within rather broad limits. For example, when soy protein is precipitated from an extract heated to about 100° C. and film dried by the use of a drum dryer, a convenient concentration of protein in the aqueous slurry is about 10%–15% by weight. On the other hand, when soy protein which has not been subjected for a substantial period of time to high temperatures, i. e., over about 70° C., is similarly dried, a concentration of protein in the aqueous slurry of about 25% is preferred.

The concentration of oilseed protein in the sheets formed by film-drying, and consequently in the subsequently formed protein flakes, must be in the ratio of at least 4:1, i. e., 80 to 100 parts of protein to 20 to zero parts of water and preferably in the ratio of 90 to 95 parts of protein to 10 to 5 parts of water. When the sheets of oilseed protein and protein flakes have a protein concentration less than the above, the protein flakes are too soft and not sufficiently chewy in the food product.

The thickness and width of the oilseed protein flakes are important in determining the textural characteristics of the food product. When a protein slurry containing about 25% protein is drum dried on a double drum dryer operating with about 30 to about 60 p. s. i. g. steam pressure in the drums and a drum separation of 0.008 inch, the uniform brittle protein sheet obtained is about 0.0025 inch thick and contains approximately 90% to 95% solids and 10% to 5% water. When the steam pressure is about 5 to about 20 p. s. i. g. and the drum separation 0.008 inch, the uniform brittle protein sheet obtained is about 0.008 inch thick and contains about 85% solids and 15% water. A product made with the thinner sheet exclusively is usually relatively smooth and non-particulate. On the other hand, a product made with the thicker sheet exclusively is relatively coarse-feeling in the mouth and particulate. Products which are intermediate in coarse-feeling in the mouth and particulateness can be made by using varying proportions of the thinner and thicker flakes, or by using flakes which are of intermediate thickness, e. g. about 0.004 inch thick. The dye content of the thicker protein flakes may be higher than that of the thinner flakes, so that when the two types of flakes are used in admixture the thicker flakes in the final spread product will give the visual, as well as organoleptic impression of small pieces of meat.

The sheets of oilseed protein formed by film-drying are cut in a conventional cutter, such as a Fitzpatrick comminuting mill, to form protein flakes. These flakes are then blended with an aqueous emulsion of fat which may contain flavoring and other ingredients. Alternatively, the sheets are blended with the emulsion by cutting in a conventional food cutter, such as a Hobart cutter, in the presence of the emulsion. In either case, the blending should be regulated so that the protein flakes formed are not so small that the product is a structureless paste, as might be the result if mixing or cutting is carried to excess. On the other hand, the flakes should not be too large. Accordingly, most of the protein flakes formed by cutting should have a width of about 1 to about 3 mm. However, substantial amounts of smaller and larger flakes do not impair, and may even improve, the textural characteristics of the food product. Also, by varying the width of the thicker protein flakes relative to that of the thinner flakes, as well as the amount, further variations in the texture of the food product can be achieved.

The degree of mixing to which the shaped flakes and aqueous emulsion of fat is subjected is important in the development of the desired texture and appearance. The preferred mixing is similar to that developed in a Hobart mixer with agitation at high speed for 10 to 15 minutes. Under-mixing can result in a product that separates into liquid and particles quite readily, whereas over-mixing can result in a pasty product.

The amount of fat, for example cottonseed oil, in the food product should be from about 10% to about 30% by weight and preferably about 20% by weight. The amount of protein present in the food product in the form of protein flakes is not critical, about 15% by weight being satisfactory. The final product can be made softer or firmer by lowering or raising the protein content.

The mixture of protein flakes and aqueous emulsion of fat may contain edible outer additives, i. e. edible additives which are external to the protein flakes and not present in the protein flakes themselves as is true of the edible inner additives. The amount of edible outer additives may be adjusted as desired, about 1% to about 3% being a typical amount. The edible outer additives are used as texturizing and/or stabilizing agents. They impart spreadability to the product and prevent the binding of the protein flakes to one another during heating. A protein food product resembling a meat spread may be made moister or drier, firmer or softer, more or less fatty in eating quality by the addition to the mixture of protein flakes and aqueous emulsion of fat of edible outer additives such as carbohydrates, proteins, and fatty materials. Edible outer additives which may be used advantageously include starches; flours; gums; fats; proteinaceous materials such as oilseed protein, gelatin, skim milk powder and casein; cracker meal; bread crumbs; and oilseed meal. Coloring materials and fortifying nutrients, such as vitamins, may also be added as outer additives.

As noted above flavoring materials may be present in the protein flakes themselves. Flavoring materials are also generally present in the aqueous emulsion of fat. The protein food product may be flavored to taste, for example, by the addition of smoked ham flavors, spiced ham flavors, chicken spread flavors, salts, spices, and spice oils. A small amount of meat or meat product may also be added, if desired.

The mixture of protein flakes and aqueous emulsion of fat, either with or without edible inner and outer additives, may be heated generally over 80° C. for a prolonged period of time to facilitate hydration of the protein flakes. The flakes, however, hydrate extensively upon standing in contact with the aqueous emulsion of fat even without the application of heat to yield a product with meat spread-like characteristics. Hydration of the protein flakes is necessary in order to obtain soft yielding flakes having the desired texture in a meat-type spread. If desired, the mixture can be packed into cans or jars by conventional means and heated therein, either to pasteurize the product or to make it sterile.

The film-drying of the oilseed protein, sizing of the resultant protein sheet, and subsequent hydration of the protein flakes imparts structure, chewiness and moistness to the protein.

The process of the present invention will be further illustrated by the following example.

*Example 1*

An aqueous slurry of soybean protein having the following composition by weight was drum dried after thorough blending at 140° F. in a paste mixer.

| Components: | Percent by weight |
| --- | --- |
| Spray dried pH 7 soy protein | 25 |
| Salt (sodium chloride) | 1 |
| Cottonseed oil | 10 |
| Coloring material (Carmine NF No. 40) | 0.01 |
| Water to 100%. | |

The slurry was dried on the rolls of a double drum dryer. The drums were separated 0.008 inch and the steam pressure in the drums was 60 p. s. i. g. The mixture was obtained as a uniform brittle sheet with average thickness of 0.0025 inch a solids content of 90%, and a protein to water ratio of about 6:1.

Another aqueous slurry of soybean protein was prepared having the following composition by weight.

| Components: | Percent by weight |
| --- | --- |
| Spray dried pH 7 soy protein | 25 |
| Salt (sodium chloride) | 1 |
| Cottonseed oil | 5 |
| Coloring material (Carmine NF No. 40) | 0.02 |
| Tetrasodium pyrophosphate, decahydrate | 0.21 |
| Water to 100%. | |

The slurry was drum-dried with a roll separation of 0.008 inch and a steam pressure in the drums of 10 p. s. i. g. The mixture was obtained as a uniform brittle sheet with average thickness of 0.008 inch, a solids content of 85%, and a protein to water ratio of about 5:1.

The 0.0025 inch and 0.008 inch sheets were ground through a Fitzpatrick comminuting mill equipped with a screen with ⅛ inch (3.2 mm.) diameter openings. In both cases, the mill knives were operated at 1000 R. P. M.

An emulsion was prepared composed of the following:

| Components: | Percent by weight |
|---|---|
| Carboxymethyl cellulose | 0.19 |
| Guar gum | 0.09 |
| Cottonseed oil | 19.28 |
| Smoked ham flavor | 6.47 |
| Water | 73.97 |
| | 100.00 |

The mixture was homogenized with a conventional homogenizer or a colloid mill.

A mixture was then prepared containing the following:

| Components: | Percent by weight |
|---|---|
| Flakes, 0.0025 inch thick | 19.2 |
| Flakes, 0.008 inch thick | 4.4 |
| Hydrochloric acid, 3 N (sufficient to lower the pH of the mixture to 6.15) | 0.2 |
| Emulsion | 76.2 |
| | 100.00 |

The various components were blended with a Hobart mixer equipped with a 20 quart bowl, mixing at high speed for 15 minutes.

The resulting blend was heated to 140° F. and packed into 8-oz. jars by means of a piston-type stuffer. The jars were sealed with a vacuum closure. The product was finally autoclaved for 70 minutes at 240° F. and cooled in running water.

The protein food product resembled meat spread in appearance, taste and texture. It also had good nutritive value.

*Example 2*

A protein extract was prepared from edible grade soy meal whose nitrogen was practically completely extractable by the following procedure. First, a 5% suspension of soy meal in an aqueous 0.003 M CaO solution was prepared. While the suspension was stirred, steam was introduced by means of a sparger until the temperature of the suspension was 60° C. The suspension at a pH of 7 was stirred for 5 minutes while at this temperature. It was then pumped to a centrifuge where practically all of the insoluble matter was removed.

The extract, while it was stirred, was heated to a temperature of 95–100° C. by sparging steam into it. Approximately 6 N HCl was gradually added until the pH of the resulting suspension was lowered to 5.0. This precipitated the protein. The suspension of protein was then pumped to a basket centrifuge where it was collected as a wet cake containing about 25–35% protein.

Finally, the protein was washed as follows: The protein was suspended in a volume of water approximately equal to that of the extract from which it was precipitated, and the slurry was passed between the rotor and stator of a colloid mill in order to disperse the protein thoroughly. The dispersion, as it was stirred, was then heated to 95–100° C. by means of steam, and, after it was at this temperature for 5 minutes, it was pumped to a basket centrifuge. The protein was collected as a cake containing about 25–35% protein.

An aqueous slurry of the protein having the following composition by weight was drum-dried after thorough blending by means of a colloid mill.

| Components: | Percent by weight |
|---|---|
| Protein precipitated at 95–100° C. (anhydrous basis) | 13 |
| Salt (sodium chloride) | 0.52 |
| Hydrogenated cottonseed oil | 0.52 |
| Water, and sufficient sodium hydroxide to elevate the pH of the protein to 6.7 to | 100%. |

The slurry was dried on the rolls of a double drum dryer. The drums were separated 0.005 inch and the steam pressure in the drums was 60 p. s. i. g. The mixture was obtained as a uniform brittle sheet with average thickness of 0.003 inch, a solids content of 90%, and a protein to water ratio of about 8:1.

The protein sheet was ground through a Fitzpatrick comminuting mill equipped with a screen with ⁷⁄₃₂ inch diameter openings, the mill knives operating at 1000 R. P. M.

An emulsion was prepared composed of the following:

| Components: | Percent by weight |
|---|---|
| Cottonseed oil | 24.04 |
| Pregelatinized wheat starch | 1.20 |
| Gelatin | 1.20 |
| Carboxymethyl cellulose | 0.42 |
| Smoked ham flavor | 3.92 |
| Tetrasodium pyrophosphate, decahydrate | 0.24 |
| Coloring material (F. D. & C. Red No. 1) | 0.002 |
| Water | 68.98 |
| | 100.00 |

The mixture was homogenized with a conventional homogenizer or colloid mill. Sufficient HCl was added to the emulsion prior to homogenizing to yield a final spread mix with pH 6.2–6.3.

A mixture was then prepared containing 16.81% flakes and 83.19% emulsion. This was mixed with a Hobart mixer equipped with a 20 quart bowl, mixing at high speed for 15 minutes.

The resulting blend was packed into 202 x 202 tinned cans by means of a piston-type stuffer. The product was then autoclaved for 60 minutes at 240° F. and cooled in running water.

It will be appreciated that similar protein food products can be prepared by substituting peanut protein for soybean protein in the above examples.

Various modifications may be made in the process of the invention, many of which have been suggested above, without departing from the spirit thereof, and accordingly the process of the invention is to be limited only within the scope of the appended claims.

We claim:

1. The process of preparing a protein food product resembling a meat spread comprising film-drying an aqueous slurry containing oilseed protein to form sheets with a protein concentration of at least 4 parts protein to 1 part water, cutting the sheets into small discrete flakes, mixing the protein flakes with an aqueous emulsion of fat, and hydrating the protein flakes; said protein flakes having a pH within the range of about 4.5 to about 7.0.

2. The process as set forth in claim 1 wherein the aqueous slurry contains edible inner additives.

3. The process as set forth in claim 1 wherein the emulsion contains edible outer additives.

4. The process as set forth in claim 1 wherein the oilseed protein is soybean protein.

5. The process as set forth in claim 1 wherein the oilseed protein is peanut protein.

6. The process as set forth in claim 1 wherein the protein flakes have a width of from about 1 millimeter to about 3 millimeters and a thickness of from about 0.0025 inch to about 0.008 inch.

7. The process of preparing a protein food product resembling a meat spread comprising film-drying an aqueous slurry containing oilseed protein having a pH within the range of about 4.5 to about 7.0 to form sheets of oilseed protein having a protein concentration of at least 4 parts protein to 1 part water, cutting the sheets into small discrete flakes, mixing the protein flakes with an aqueous emulsion of fat, and hydrating the protein flakes.

8. The process of preparing a protein food product resembling a meat spread comprising film-drying an aqueous slurry containing oilseed protein to form sheets of oilseed protein having a protein concentration of at least 4 parts protein to 1 part water, cutting the sheets into small discrete flakes, mixing the protein flakes with an aqueous emulsion of fat containing sufficient reagent to adjust the pH of the protein flakes within the range of about 4.5 to about 7.0, and hydrating the protein flakes.

9. The process of preparing a protein food product resembling a meat spread comprising film-drying an aqueous slurry containing oilseed protein to form sheets with a protein concentration of at least 4 parts protein to 1 part water, cutting the sheets so formed into small discrete flakes in the presence of an aqueous emulsion of fat, and hydrating the protein flakes; said protein flakes having a pH within the range of about 4.5 to about 7.0.

References Cited in the file of this patent

UNITED STATES PATENTS

| | | |
|---|---|---|
| 670,283 | Kellogg | Mar. 19, 1901 |
| 869,371 | Kellogg | Oct. 29, 1907 |
| 2,560,621 | Wrenshall | July 17, 1951 |

FOREIGN PATENTS

| | | |
|---|---|---|
| 746,859 | Great Britain | Mar. 21, 1956 |